United States Patent [19]

Yasuike et al.

[11] 4,174,413
[45] Nov. 13, 1979

[54] MULTI-LAYERED MOLDED ARTICLES

[75] Inventors: Akio Yasuike, Yokohama; Hiroshi Kataoka, Tokyo; Norito Takao, Yokohama, all of Japan

[73] Assignee: Asahi-Dow Limited, Tokyo, Japan

[21] Appl. No.: 816,469

[22] Filed: Jul. 18, 1977

[30] Foreign Application Priority Data

Jul. 27, 1976 [JP] Japan ............................ 51-89507
Nov. 1, 1976 [JP] Japan ............................ 51-130546
Dec. 23, 1976 [JP] Japan ............................ 51-154182
Apr. 27, 1977 [JP] Japan ............................ 52-48971

[51] Int. Cl.² ............... B65D 23/00; B28B 1/24; B29F 1/00; B32B 3/02
[52] U.S. Cl. ............... 428/35; 215/1 C; 264/328; 264/329; 428/64; 428/213
[58] Field of Search ............... 264/328, 329; 215/1 C; 428/35, 64, 213

[56] References Cited

U.S. PATENT DOCUMENTS

| 3,894,823 | 7/1975 | Hanning | 264/329 |
| 3,906,066 | 9/1975 | Barrie | 264/328 |
| 4,035,466 | 7/1977 | Langecker | 264/328 |
| 4,052,497 | 10/1977 | Monnet | 264/328 |

FOREIGN PATENT DOCUMENTS 1362133 7/1974 United Kingdom .

*Primary Examiner*—William R. Dixon, Jr.
*Attorney, Agent, or Firm*—Cushman, Darby & Cushman

[57] ABSTRACT

A multi-layered article molded according to the present invention has in its cross-section a triple-layered structure consisting of two surface layers and a core layer interposed between said surface layers, said triple-layered structure being injection molded in a single shot from two kinds of thermoplastic synthetic resins to be formed into the surface and core layers, respectively, said core layer having a thickness less than one half of the entire thickness of said article.

13 Claims, 29 Drawing Figures

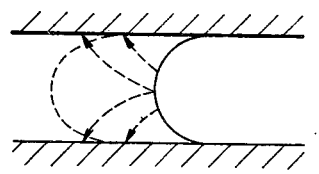
FIG. 1(a)
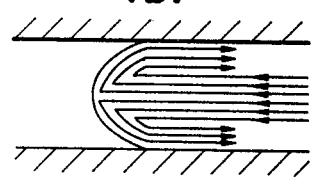
FIG. 1(b)
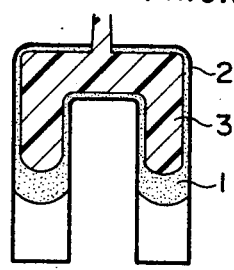
FIG. 2.(a) PRIOR ART
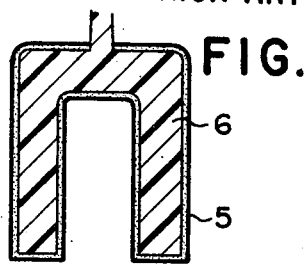
FIG. 2(b) PRIOR ART
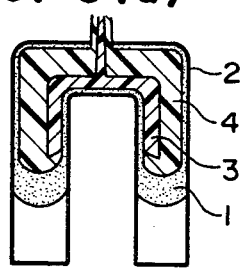
FIG. 3(a)
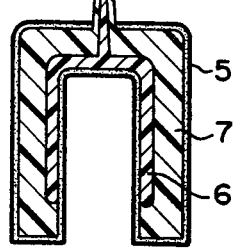
FIG. 3(b)
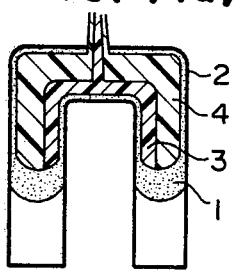
FIG. 4(a)
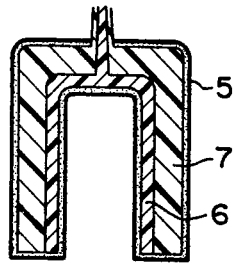
FIG. 4(b)

FIG. 5(a)
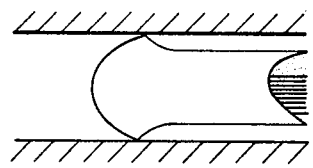
FIG. 5(a')
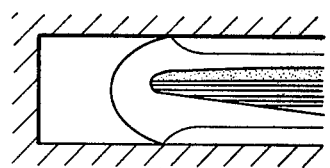
FIG. 5(b)
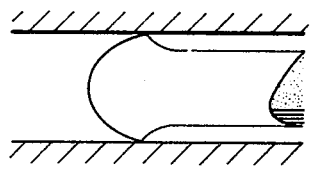
FIG. 5(b')
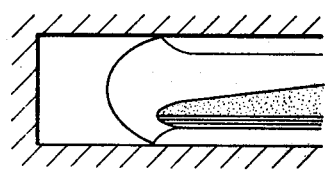
FIG. 6(a)
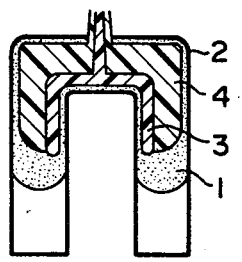
FIG. 6(b)
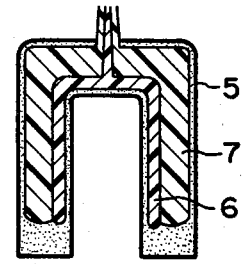
FIG. 7(a)
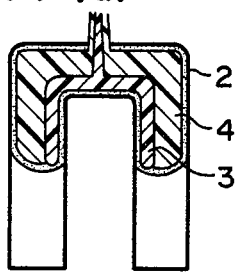
FIG. 7(b)
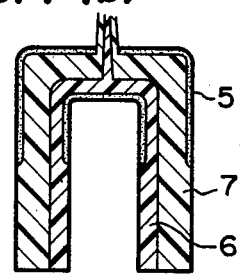

FIG.8(a)
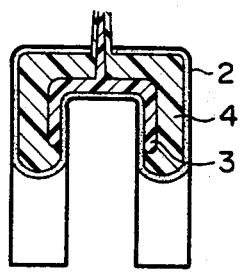
FIG. 9(a)
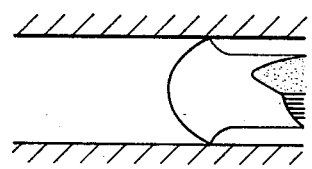
FIG. 9(a')
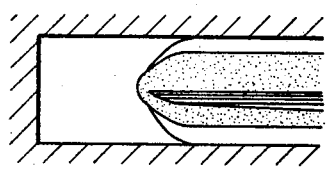
FIG.9(b)
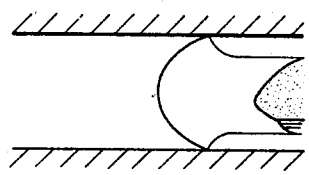
FIG.9(b')
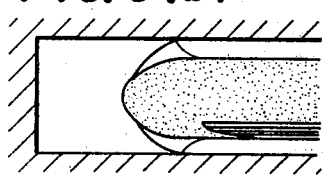
FIG. 10
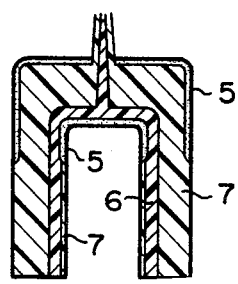

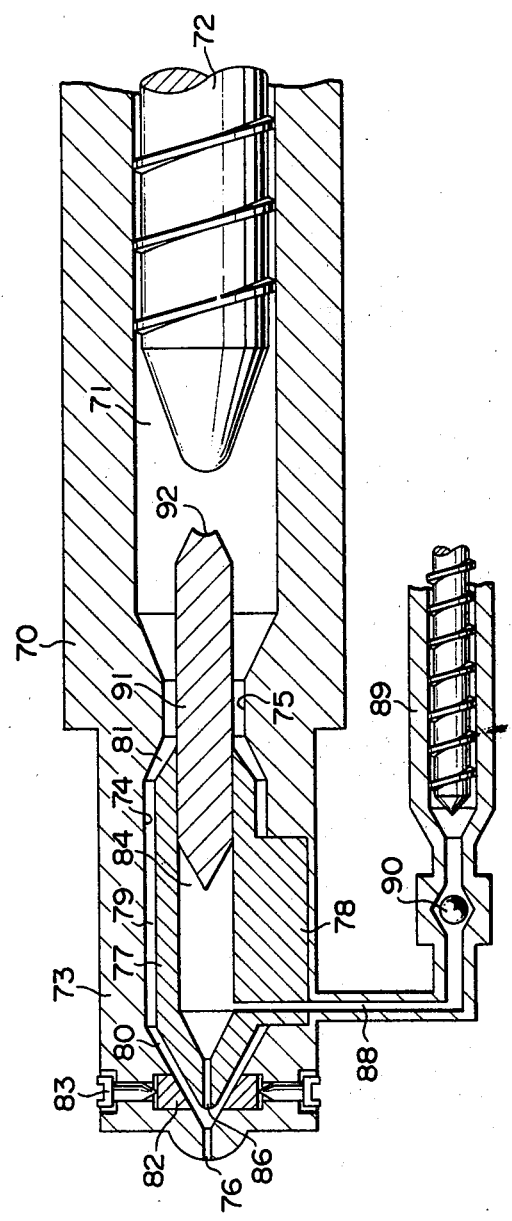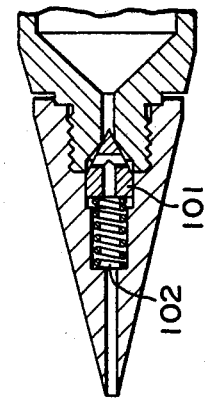

MULTI-LAYERED MOLDED ARTICLES

The present invention relates to a multi-layered article made of thermoplastic synthetic resins which has a triple-layered cross-section with the core layer thereof having a thickness less than one half of the entire thickness of the article and which is superior in at least one of various properties such as gas permeability, high-impact property, rigidity, appearance or the like. The present invention also relates to a process and apparatus for injection molding the above-mentioned multi-layered article.

Multi-layered articles made of two or more kinds of synthetic resins have been recently developed and accepted for many applications such as vessels for food. When articles are required to have a plurality of properties such as rigidity and barrier ability or strength and chemical resistance, it is difficult to satisfy such requirements by only a single kind of synthetic resin. Otherwise, remarkably expensive synthetic resins must be used to obtain articles having the desired properties. However, the multi-layered articles can satisfy the requirements as mentioned above by using two or more kinds of inexpensive resin materials each of which has at least one of the desired properties.

Vessels having multi-layered structures have been produced in many cases by blow molding preforms which had previously extrusion molded. However, such products have many disadvantages. For example, they tend to have discontinuous weakened portions or excessive materials to be trimmed.

An injection molding process or the combination of a blow molding process therewith is valuable since it does not have the disadvantages present in an extrusion molding process. In addition, such a molding process has many advantages in that it is possible to obtain highly accurate products due to superior duplicability and due to injection mold preforms which are very suitable for forming them in the blow molding operation. If the aforementioned multi-layered articles were obtainable by the injection molding process, one would produce economically the articles which are extremely preferred as vessels.

The injection molding process for producing the multi-layere articles can be classified into the following methods:

(1) A first method comprising the steps of injecting two or more kinds of synthetic resin into a mold cavity under a laminar flow condition and holding such laminar flow condition in the mold cavity until it is filled with the synthetic resins. For example, see U.S. Pat. No. 3,339,240.

(2) A second method comprising the steps of injecting first of all only the kind of synthetic resin to be formed into the surface layers into the mold cavity in the desired amount and subsequently injecting another kind of synthetic resin to be formed into a core layer until the mold cavity is filled with these synthetic resins. For example, see U.S. Pat. No. 2,996,764 and DT-OL No. 2,308,571.

(3) A third method comprising the steps of injecting first of all only one kind of synthetic resin to be formed into the surface layers into the mold cavity in the desired amount and subsequently injecting another kind of foamable synthetic resin to be formed into a core layer as well as the synthetic resin for the surface layers until the mold cavity is filled therewith to form a foamed structure. For example, see Swiss Pat. No. 528,359.

(4) A fourth method comprising the steps of placing a preform which has been previously injection molded in a cavity which resembles in shape a preform but of the dimension greater than it and subsequently injecting further the material around the preform in the mold cavity. For example, see Japanese Patent Publication No. 29980/1971.

The first method is used in a case where a multi-layered article has outer and inner surface layers made of different kinds of synthetic resins or where a kind of synthetic resin for forming an outer layer has its viscosity equal to that of another kind of synthetic resin for forming an inner layer with the layers having the same thickness. However, when the viscosity and thickness of the outer layer are different from that of the inner layer, the laminar flows of the synthetic resins moving in the mold cavity tend to unbalance at their leading portions so that they will be mingled with each other resulting in a molded article with no desired layered structure. Moreover, when the first method is used to produce a molded article having the outer and inner surface layers of the same material and the core layer of different material, the apparatus for carrying out the first method is extremely complicated and expensive due to the needs of a nozzle having two or more manifolds and the like.

The second method is called "Sandwich injection molding" wherein a machine used for carrying out this method is relatively simple in structure. The second method can use synthetic resins of different viscosities, but the molded products obtained having thick core layers which cannot be optionally varied.

The third method is used to produce certain foamed structures having a foamed core layer as well as unfoamed surface layers. This method does not take into consideration two kinds of synthetic resins injected simultaneously into the mold cavity.

The fourth method is preferred for producing a multi-layered article having surface and core layers of relatively great thickness. However, in this method it is hard to mold an article having layers thinner than 1 mm since it is required to use a very large injecting pressure during the injecting operation. Moreover, the fourth method is economically disadvantageous since it is necessary to use a number of molds as well as many molding operations.

We have found the fact that multi-layered articles can be injection molded of thermoplastic synthetic resins with the core layer thereof interposed between the surface layers and having the desired thickness and position by injection first a first kind of synthetic resin for forming the surface layers into a mold cavity and subsequently a second kind of synthetic resin for forming the core layer as well as another body of the first synthetic resin at the same time or sequentially into the mold cavity, and maintaining within specific limitations the amount of the first synthetic resin firstly injected, the ratio of flow rate between the first and second synthetic resins simultaneously injected and the ratio of melt viscosity between the two synthetic resins.

The present invention provides multi-layered molded articles made of two kinds of thermoplastic synthetic resins for forming surface and core layers and having the shape of vessel, closed-end parison, disk or the like, each of which has the triple-layered cross-sectional structure with the core layer thereof interposed between the surface layers of the article, the core layer having its thickness less than one half of the entire thickness of the article.

In such a triple-layered structure, the surface layers are layers defining each side face for a plate-like article, and layers defining outer and inner wall for a cylindrical or vessel-like article. In any case, the core layer means a thin layer extending uniformly between the surface layers over the entire article. As previously described, the triple-layered article as above-mentioned provides various useful molded articles having the desired properties. For example, the present invention provides vessels having a stable gas barrier and low water vapor permeability by using gas barrier synthetic resin as the surface layers and little water vapor permeable synthetic resin as the core layer.

The technique for injection molding two kinds of synthetic resin to produce multi-layered articles is classified into the following processes:

a process characterized by a substantially simultaneous injection of the synthetic resins including the steps of injecting the synthetic resin accumulated in two injecting cylinders by a single shot, injecting the synthetic resins accumulated in a single cylinder without mingling with each other by a single shot, or injecting firstly only one kind of synthetic resin and subsequently injecting another kind of synthetic resin before the firstly injected material is cooled to prevent another material from flowing in; and a process characterized by the steps of cooling completely a preform which has been injection molded by a first shot and thereafter placing the preform within another mold cavity having a similar shape but greater dimension to form a space around the preform placed in the mold cavity, the material being injected into said space around the preform by a second shot.

The present invention belongs to the former type of process which is preferred in comparison with the latter process wherein a plurality of expensive molds is required with the molding steps increased, and the molded articles are generally limited to having the thickness of each layer thicker than 1 mm.

The fact that the thickness of the core layer is less than one half of the entire thickness of the article means that the core layer thickness is less than the total thickness of the surface layers. This means that the core layer having gas barrier properties can be economically produced using a gas barrier resin which is expensive.

Moreover, the present invention provides particularly preferred molded articles having thicker hardening layers which are formed in the surface layers at the portion thereof contacting the inner walls of the mold cavity since the core layer can be formed with the thickness thereof less than one half of the value which is subtracted by the thickness of the hardening layers from the entire article thickness.

Stated in other words the "hardening layer" is the resin layer which is cooled and sets and is located adjacent to the inner wall of the mold immediately after the mold cavity has been filled with the desired amount of resin.

The present invention further provides extremely useful multi-layered articles which have their cross-sectional structure represented by $$a+b<\tfrac{1}{2}(a+b+c)$$

where a is the thickness of the core layer, b is the thickness of the thinner surface layer and c is the thickness of the thicker surface layer.

In multi-layered articles injection molded according to the prior art, the core layer must be increased in thickness when it is desired to position the core layer as near the surface layer as possible. However, in the multi-layered articles injection molded according to the present invention which have their cross-sectional structure represented by $a+b<\tfrac{1}{2}(a+b+c)$, the core layer can be positioned near the surface layer without increasing the thickness of the core layer.

Thus, the present invention provides multi-layered molded articles having many practically useful advantages as described hereinafter.

In general, the core layer is formed by expensive synthetic resin materials having particular properties such as barrier ability, high strength and the like. It is therefore apparent that the thinner the core layer, the more economically the article is produced.

In cylindrical or similarly shaped vessels, they can be made of a lesser amount of the synthetic resin by using the core layer positioned in a location near the inner wall of the vessel rather than the central portion of the wall thickness when the core layer is very thin in comparison with the entire wall thickness of the vessel. This is a remarkable advantage in economy when a large number of vessels are produced.

In a cylindrical multi-layered article used as a vessel containing pressurized fluid such as a carbonated beverage, sufficient strength would be obtained in spite of the thinner wall thickness if the core layer of high strength synthetic resin is formed near the inner wall of the vessel which is subjected to the largest stress.

When a localized force may be applied to the outer wall of the vessel, the core layer of high strength synthetic resin is formed near the outer wall of the vessel to prevent any crack in the outer wall from reaching the inner wall of the vessel.

In a triple-layered molded article having an outer transparent surface layer and a colored core layer, it is well known that in appearance it becomes deeper in color as the outer surface layer increases in thickness. According to the present invention, the same advantage may be obtained by forming the core layer near the inner wall of the article without increasing the wall thickness thereof.

It is apparent from the foregoing that the present invention enables the core layer to be formed in the wall thickness of an article at the desired position between the outer and inner walls. The present invention may be preferably applied to articles such as vessels and the like in which the core layer is used with an extremely thin thickness, for example, less than one fourth of the entire wall thickness.

The thermoplastic synthetic resins used for forming the surface and core layers according to the present invention include any thermoplastic synthetic resin which is commercially available. The synthetic resin for the core layer is preferably selected from the group consisting of vinyl chloride-vinylidene chloride copolymer, saponified ethylene-vinyl acetate copolymer, nylon acrylonitrile-styrene copolymer containing a major amount of acrylonitrile and blends thereof. These resins are superior in gas barrier ability.

The high strength synthetic resin may be selected from the group consisting of acrylonitrile-butadiene-styrene copolymer, polyethylene terephthalate, the above barrier resin modified by glass polyacetal and polycarbonate and the like. Moreover, any additive such as colorant, etc. may be used together with each of the above synthetic resins.

It is to be understood that the present invention also includes the use of only a single kind of synthetic resin. In such a case, the surface layers and/or the core layer may be formed by the same synthetic resin containing any suitable additive.

When the different kinds of synthetic resins are not miscible with each other, any adhesive resin may be blended with one or both of the different kinds of synthetic resins so that the connection between the surface and core layers may be prevented from debonding. This is preferred particularly when the surface layers are formed by a polyolefin and the core layer is formed by a blend of saponified ethylene-vinyl acetate copolymer and polyolefin, the weight ratio of said blend being 10–90:90–10.

In order to accomplish the same purpose, the core layer may be formed by a blend consisting of saponified ethylene-vinyl acetate copolymer, polyolefin and thermoplastic polymer in which the carbonyl group presents at a concentration of 120–1400 meq per 100 g of said polymer on its backbone chain or side chain, said polymer being present in the range of 0.5 to 15 parts by weight per 100 parts by weight of the total amount of said polyolefin and saponified ethylene-vinyl acetate copolymer. The ethylene-vinyl acetate copolymer described herein defines a copolymer containing ethylene in an amount of 25 to 50% by mol and having a saponification degree of more than 96%. The thermoplastic polymer has, on its backbone chain or side chain, carbonyl groups based on liberated carboxylic acid, carboxylates, carboxylate amide, carboxylic anhydride, carbonate, urethane and urea at a concentration of 120–1400 meq per 100 g of said polymer. Such thermoplastic synthetic resins include a copolymer consisting of ethylene and vinyl monomer containing carboxylate groups such as polyvinyl acetate, ethylene-vinyl acetate copolymer, acrylic grafted polyethylene and ionomer, an aliphatic polyamide such as polyhexamethylene adipamide and the like.

Multi-layered moldings obtained according to the present invention may be used as a preform in a subsequent step such as blow molding, vaccum forming or forming under vacuum and pressurized air.

According to the present invention, a multiple layered molded article may be produced by a process comprising the steps of injecting first a first kind of molten synthetic resin for forming the surface layers into a mold cavity and subsequently injecting a second kind of synthetic resin as well as another body of said first kind of synthetic resin into said mold cavity in a concentric layered configuration, said injection steps being effected holding the volume of said first kind of synthetic resin firstly injected, the ratio of flow rate in the first to second synthetic resin simultaneously injected and the ratio of melt viscosity of the same within specific limitations.

Such specific limitations means that the volume of the first synthetic resin firstly injected is equal to that of the hardening layers formed at that portion of the first resin contacting the inner wall of the mold cavity immediately after the mold cavity is completely filled with the synthetic resins, the melt viscosity of the second synthetic resin is smaller than that of the first synthetic resin and the melt viscosities and shot volumes of the first and second resins are maintained such that these synthetic resins will flow translationally in the mold cavity in a laminar configuration without one covering the other at their leading portions.

The specific limitations are concretely defined such that $M = L^2$, $V_i = 2(V_m/l_m) l_o$, $1 < Q \leq 140$, preferably $1 < Q \leq 50$, the most preferably $1 < Q \leq 15$, $1 < M \leq 140$, preferably $1 < M \leq 50$, the most preferably $1 < M \leq 15$, and $1 < L < 12$ where $V_i$ is the volume of the first synthetic resin firstly injected per unit width of the mold cavity in a direction perpendicular to the flow of resin therein, Q is the ratio of flow rate of the first to the second synthetic resin simultaneously injected, M is the ratio of melt viscosity of the same, L is the ratio of thickness of the first synthetic resin layer to the second synthetic resin layer, $V_m$ is the volume of the mold cavity per unit width thereof in a direction perpendicular to the flow of resin therein, $l_m$ is the thickness of the same, and $l_o$ is the thickness of the hardening layer formed adjacent to the inner wall of the mold cavity immediately after it is completely filled.

The multi-layered molded articles according to the present invention may be produced under another specific limitation defined such that the volume of the firstly injected synthetic resin is less than that of the hardening layers and the melt viscosities and shot volume of the simultaneously injected synthetic resins are maintained in such a manner that these resins will flow in a laminar configuration in the mold cavity with the leading portion of the second resin flow being covered by the first resin flow.

The limitation may be concretely defined such that
$M < L^2$ $$V_i < [1 - \frac{\{(M+L) + 3L(L+1)\}(Q+1)}{\{(M+L) + 3L(L+1)\} + 6L^2(L+1)}] V_m + [\frac{\{(M+L) + 3L(L+1)\}(Q+1)}{\{(M+L) + 3L(L+1)\} + 6L^2(L+1)}] \cdot \frac{2V_m}{l_m} \cdot l_o$$

$1 < Q \leq 140$, preferably $1 < Q \leq 50$, the most preferably $1 < Q \leq 15$, $1 < M \leq 140$, preferably $1 < M \leq 50$, the most preferably $1 < M \leq 15$, and $1 < L \leq 80$, preferably $1 < L < 12$.

The present invention will now be described with reference to the accompanying drawings in which:

FIG. 1 illustrates the action of synthetic resin flowing within a flow passage; (a) being from the direction parallel to the flow of resin, and (b) from fixing the viewpoint at the leading end of the flow FIGS. 2 through 10 illustrate the action and state of the respective synthetic resin materials injected into a mold cavity, FIGS. 2, 3, 6 and 7 illustrating the condition of the material injected according to processes other than the present invention, FIGS. 4 and 8 illustrating the condition of the material injected according to the present invention, FIGS. 5 and 9 illustrating schematically various conditions of flow at the leading portion in the mold cavity and FIG. 10 illustrating the condition of synthetic resins injected according to another embodiment of the present invention;

FIG. 14 is a cross-sectional view showing the main portion of still another injection molding machine according to the present invention;

FIG. 15 illustrates a valve which may be located in the orifice of the injecting cylinder as shown in FIG. 14.

Figure 8B:
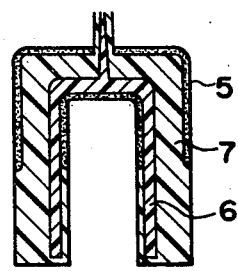

The action of a synthetic resin injected into a mold cavity is generally complicated depending on the shape of the mold cavity and the like. It is known in the art that this is illustrated as shown in FIG. 1a when viewed in section in a direction parallel to the main flow of the synthetic resin. In FIG. 1a, the injected synthetic resin flows within the mold cavity in a laminar configuration with the leading end face thereof being convex as shown by a solid line. The synthetic resin moves toward the inner walls of the mold cavity at the convex end face thereof as shown by dotted lines. When the resin is in contact with the inner walls of the mold cavity, it results in hardening layers at both sides of flow so that the central flow between said sides advances further forward to form sequentially convex leading end faces until the mold cavity is completely filled with the resin. As is illustrated more clearly in FIG. 1b, therefore, the hardening layers are sequentially formed of the material supplied from the central flow. If a first kind of synthetic resin for forming surface layers is followed by a second kind of synthetic resin for forming a core layer with the first resin being less than the second resin, the hardening layers would be formed of the second kind of synthetic resin in mid course.

The thickness of the hardening layer depends on the temperatures of the resin and mold, velocity of flow and the like. If these factors are appropriately selected, the thickness of the hardening layer can be determined as desired.

It is understood from the foregoing that a multi-layered article having surface layers and a core layer interposed therebetween can be produced if the material for forming the surface layers is equal in volume to the hardening layers to be formed.

FIG. 2 shows the prior art in which a first kind of resin 1 is first injected into a mold cavity in a volume sufficient to form hardening layers 2 and followed by a second kind of resin 3. During flowing within the mold cavity, as shown in FIG. 2a, the first resin 1 is present in advance of the second resin 3. This body of the first resin 1 is forced forward by the second resin continuously injected into the mold cavity to form sequentially the hardening layers 2 until an article is formed with thinner hardening layers 5 adjacent to the inner wall of the mold cavity and a thicker core layer 6 surrounded by the hardening layers 5 as shown in FIG. 2b.

FIG. 3 shows a state of flow in a process other than the present invention in which the first resin 1 is first injected into the mold cavity in a volume sufficient to form the hardening layers 2 and subsequently another body of the first resin 4 is injected into the mold cavity together with the second resin 3 with the first resin positioned in advance of the leading portion of the second resin. During flowing, as shown in FIG. 3a, the first resin 4 is moved forward covering the leading portion of the second resin 3 and still increased progressively in amount. When the mold cavity is completely filled with the resins, therefore, the closed ends of the mold cavity are occupied by layers 5 and 7 of the first resin with no second resin layer 6 as shown in FIG. 3b.

FIG. 4 shows a state of flow in a process corresponding to a first embodiment of the present invention in which the first resin 1 is first injected into the mold cavity in a volume equal to form the hardening layers 2 and followed by the second resin 3 as well as another body of the first resin 4, the first and second resin 4 and 3 being moved translationally without covering one another and flowing in a laminar form between the hardening layers 2 formed of the first resin 1 as shown in FIG. 4a. As seen from FIG. 4b, the second resin reaches the closed ends of the mold cavity when it is completely filled.

FIG. 5 shows in enlarged scale the state of flow illustrated in FIG. 4. The first and second resins are in the conditions as shown in FIGS. 5a and 5b, respectively. FIG. 5a shows the second resin of relatively large amount while FIG. 5b shows the second resin of relatively little amount. FIGS. 5a' and 5b' show the condition of flow corresponding to that of FIGS. 5a and 5b after the time passed, respectively.

It is apparent from FIG. 5 that the second resin for the core layer must be moved translationally in a thin layered form so as to form the core layer having its uniformly small thickness. This may be accomplished by maintaining the melt viscosities and flow rates of the first and second resins at a specific relationship therebetween according to the present invention.

In order to form a molded article having its uniform core layer of a thickness smaller than one half of the entire wall thickness of the article, the second resin must have a melt viscosity smaller than that of the first resin for forming the surface layers. If the second resin has its melt viscosity equal to or greater than that of the first resin, the above article could not be made since the resin of greater viscosity presses the resin of smaller viscosity to form the second resin layer having the thickness equal to or greater than that of the first resin layer when both of the first and second resins are injected at the same flow rate into the mold cavity. If the second resin is decreased in flow rate relative to the first resin in order to avoid the above problem, the desired article could not be similarly produced since the second resin will be covered by the first resin. If a second resin has a melt viscosity smaller than that of the first resin, the desired article could be made since the first resin presses the second resin to decrease the thickness of the second resin layer whereby the linear velocity of the leading portion of the second resin becomes higher than that of the first resin so that the first and second resins will flow translationally without covering one another by selecting suitably the flow rate.

This can be quantitatively explained in another way by using the symbols which have been previously defined. Namely, Vi must be equal to $2 \cdot l_o \cdot Vm/lm$ which indicates the volume of hardening layers per unit width of the mold cavity in a direction perpendicular to the flow of resin therein since the volume of first resin firstly injected should be equal to the above volume of hardening layers. Moreover, M must be equal to $L^2$ since the first and second resins should be translationally moved in the mold cavity.

As described previously, the core layer could be formed of the resin secondly injected into the mold cavity if the firstly injected resin has its volume equal to that of the hardening layers to be formed.

If the first resin firstly injected has too much volume, the closed end of the mold cavity would be occupied by the firstly injected resin so that the second resin secondly injected cannot reach the closed end of the mold cavity. If the first resin firstly injected has too little volume, the hardening layers would be formed of the second resin in part. However, if the melt viscosities and shot volume of the first and second resins simultaneously injected in the second shot are determined such that the first resin flows covering the leading portion of the second resin, the resin for forming the hardening layers would be supplied from the first resin secondly injected after the first resin firstly injected converts completely into the portion of the hardening layers. It is understood, therefore, that the total volume of the first resin firstly and secondly injected should be equal to the volume required to form the complete hardening layers in order to obtain the second resin layer formed substantially over the length of the mold cavity.

FIG. 6 shows the state of flow in a process other than the present invention in which the first resin firstly injected 1 has its volume more than that of hardening layers to be formed. FIG. 6b shows the condition under which a predetermined amount of the first and second resins are completely charged into the mold cavity. It is understood from FIG. 6b that the forward portion of the mold cavity adjacent to the closed end thereof is occupied by the first resin firstly injected so that the second resin layer does not reach the closed end of the mold cavity.

FIG. 7 shows the condition of flow in a process other than the present invention in which the first resin firstly injected has its volume less than that of the hardening layers to be formed. As seen from FIG. 7b, the first resin firstly injected is insufficient to form the hardening layers surrounding the entire core layer so that it is exposed outside the molded article.

FIG. 8 shows the state of flow in a process corresponding to a second embodiment of the present invention in which the second resin layer as a core layer is fully covered by the first resin layers and formed up to adjacent the closed ends of the mold cavity.

FIG. 9 shows in an enlarged scale the state of the resin flow at its leading portion. FIG. 9a shows the state of flow at a time immediately after the first and second resins are simultaneously injected into the mold cavity with the first resin used in relatively little amount. FIG. 9b shows another state of flow at the same time as in FIG. 9a with the first resin used in relatively large amount. As seen from FIG. 9a', the second resin layer can reach the leading portion of the resin flow in the mold cavity when the second resin is suitably covered by the first resin. As seen from FIG. 9b', however, the second resin layer cannot reach the leading portion of the resin flow when the first resin covering the second resin is in too large an amount.

In the second embodiment of the present invention, the flow rate of the first resin is larger than that of the second resin due to the reason why the first resin should be moved covering the leading portion of the second resin and also the thickness of the second resin layer should be smaller than that of the first resin layers.

Therefore, the second embodiment of the present invention is different from the first embodiment thereof in that the desired articles can be produced by maintaining the following limitations even if the melt viscosity of the second resin is not smaller than that of the first resin. The first limitation is such that the total volume of the firstly injected first resin and sequentially injected first resin which covered the leading portion of the second resin becomes equal to the volume of the hardening layers to be formed when the melt viscosity of the second resin is equal to that of the first resin. The other limitation is such that the flow rate of the first resin will be increased to prevent the second resin from pushing away the first resin when the melt viscosity of the second resin is larger than that of the first resin. In said other limitation, the total volume of the firstly injected first resin and sequentially injected first resin which covered the leading portion of the second resin should similarly be equal to the volume of hardening layers to be formed. Thus, all of the molded articles produced according to the present invention will have the core layers of thickness substantially equal to one half of the entire wall thickness thereof.

On the contrary, when the melt viscosity of the second resin is smaller than that of the first resin, the first resin presses the second resin to decrease the thickness thereof even if the flow rate of the second resin is decreased substantially smaller than that of the first resin. This results in the linear velocity of the second resin layer being higher than that of the first resin layers so that the leading portion of the second resin layer will be excessively covered by the first resin layers. Consequently, the second resin layer will reach adjacent to the closed ends of the mold cavity in the form of a uniformly thin layer.

It is understood from the foregoing that the second embodiment of the present invention may provide the desired molded articles even if the melt viscosity of the second resin is not smaller than that of the first resin as in the first embodiment thereof. Particularly, the second embodiment of the present invention is preferred when the melt viscosity of the second resin is smaller than that of the first resin.

When the total volume of the firstly injected first resin and sequentially injected first resin which covered the leading portion of the second resin is smaller than the volume of the hardening layers to be formed, the second resin may form a portion of the hardening layers at a position adjacent to the second resin layer as shown in FIG. 10. This is, of course, within the scope of the present invention. The firstly injected volume of the first resin can be optionally determined within such range that it is sufficient to permit the second resin to be exposed outside at the initial injection and insufficient to prevent the second resin from reaching adjacent the closed ends of the mold cavity.

When the above limitation is explained by using the symbols which have been defined previously, it can be quantitatively represented as follows:

$Vi+V'$ must be smaller than $2 \cdot l_o \cdot Vm/lm$ which is the volume of the hardening layers since the total volume of the first resin which is firstly injected and which is secondly injected together with the second resin to be present in advance of the leading portion of the second resin flow should be smaller than the volume of the hardening layers. The $Vi+V'$ is necessarily larger than zero. The new symbol $V'$ described herein is the volume of the first resin which presents adjacent to the leading portion of the second resin flow simultaneously injected therewith.

Thus, a known theory will induce $$[Q/(Q+1)-6L^2(L+1)/\{(M+L)+3L(L+1)\}](Vm-Vi)$$

resulting is $$Vi < [1-\{(M+L)+3L(L+1)\}(Q+1)/\{(M+L)+3L(L+1)\}+6L^2(L+1)]Vm+[\{(M+L)+3L(L+1)\}(Q+1)/\{(M+L)+3L(L+1)\}+6L^2(L+1)] \times 2 \cdot Vm \cdot lo/lm.$$

Furthermore, M must be smaller than $L^2$ due to the fact that the first resin should flow covering the second resin layer.

Figure 11:
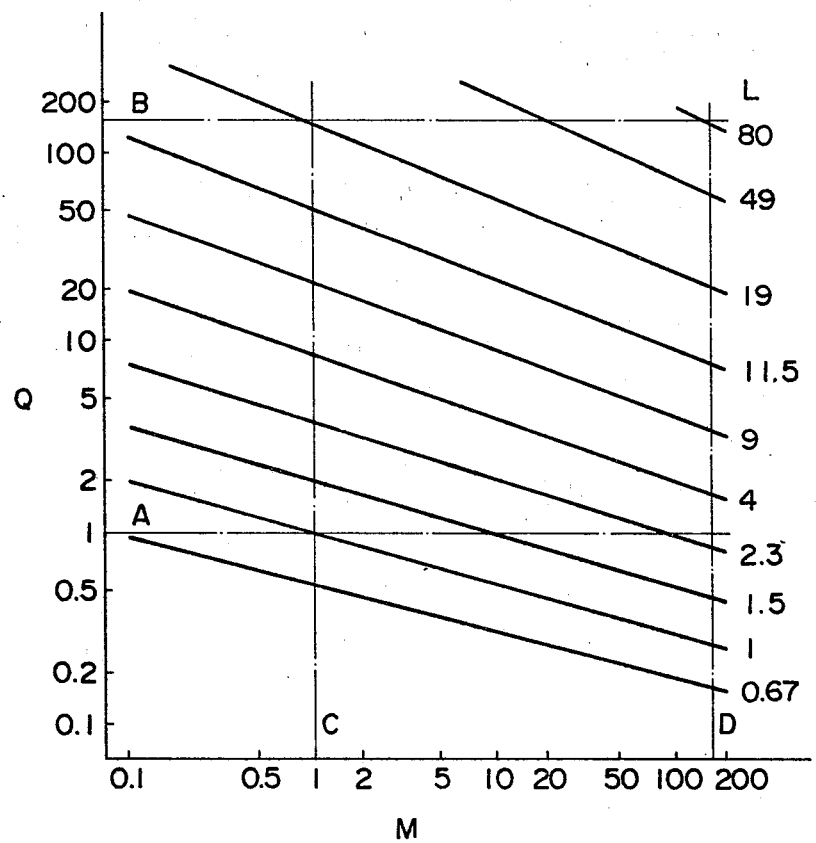
FIG. 11 is the graph showing a relationship between L, Q and M obtained from the well known theory, the range of the present invention being bounded by straight lines A, B, C and D.

FIG. 11 shows the relationship between the values of L, Q and M which is induced based on the "Double-laminar flow" theory with respect to Newtonian fluid. Therefore, these values may be easily determined from the graph in FIG. 11. Practically, the respective values of L, Q and M are limited within the following range.

For the purpose of the present invention, the thickness of the core layer is desirably larger than or equal to 0.05 mm even if it is formed of any barrier resin which may be expected to perform the advantage thereof even in the form of an extremely thin layer. However, the thickness of the core layer may be smaller than 2 mm since any injection molded article does not normally have the wall thickness larger than 4 mm. Consequently, the core layer according to the present invention is preferably in the range of 0.05 to 2 mm in thickness except the upper limit so that the value of L will be preferably in the range of 1 to 80 except the lower limit. In order to satisfy the condition $L^2 = M$ in the first embodiment of the present invention, the largest value of M will be $80^2$. This is impossible in practice. Taking into consideration the possible range of M, the value L is particularly preferred to be in the range of 1 to 12 except the lower limit.

The value of Q is related to the value of M so that under the practical limitation the both values of Q and M are in the range of 1 to 140 except the lower limit, preferably 1 to 50 except the lower limit. The most preferred range is from 1 to 15 except the lower limit. This is for the reason described hereinafter.

When the ratio of flow rates is in the range of 1 to 15 except the lower limit, the present invention may be easily carried out by modifying the nozzle portion of any injection molding machine. When the ratio is beyond 15, a flow-controlling device will be required to maintain the desired conditions. When the ratio is beyond 50, the flow-controlling device will be more expensive.

It is to be noted that various limitations in numerals described herein are based on round numbers, unless otherwise indicated specifically.

Upon attaining the process according to the present invention, the thickness of the hardening layers must be determined practically in order to determine the volume of the first resin to be firstly injected. The thickness of the hardening layers depends on the temperature of the resin, the temperature of the mold, the shot velocity and the like. When such conditions are maintained constant, the thickness can be readily determined from some experiments attained under these conditions.

The experiments are accomplished in such a manner that the first resin is first of all injected into the mold cavity and subsequently only the second resin is injected thereinto with no first resin to form a molded article having the second resin layer substantially over the length thereof. The resultant article is measured at various surface portions thereof to obtain the average thickness of the first resin layer. Either of the first or second resin is preferably colored for easy measuring operations.

Figure 12:
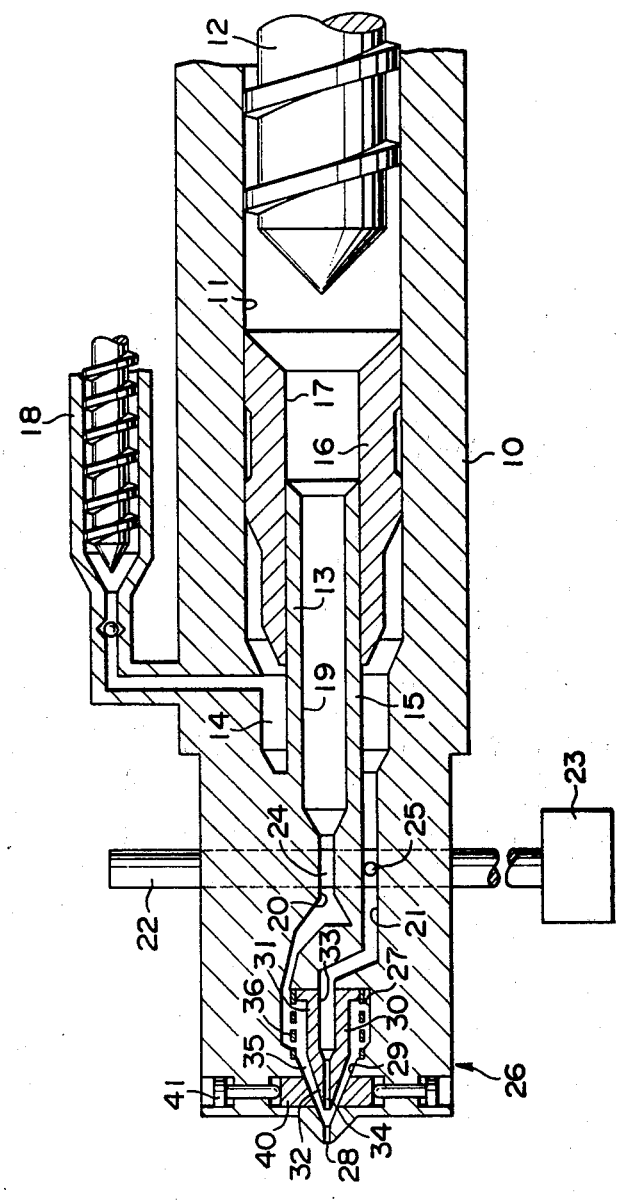
FIG. 12 is a cross-sectional view showing the main portion in an injection molding machine for carrying out the present invention.

FIG. 12 shows an injection molding machine for attaining the process according to the present invention in which an injecting cylinder 10 has an accumulating bore 11. Within the bore 11 there is mounted slidably a plastifying screw 12 which may be used as an injecting ram.

A projecting portion 13 extends rearward from the forward end of the accumulating bore 11 to define a substantailly annular space 14. The outer periphery 15 of the projecting portion 13 supports slidably a movable mandrel 16 which is mounted slidably within the bore 11 of the cylinder 10. The mandrel 16 has a central passage 17 passed longitudinally therethrough which is fitted over the outer periphery 15 of the projecting portion 13 so that the annular space 14 will be closed by the movable mandrel 17.

The annular space 14 is connected with a plastifying cylinder 18 for supplying a second resin to be formed into a core layer. A first resin for forming surface layers is supplied to the accumulating bore 11 by means of the plastifying screw 12.

The projecting portion 13 has a central passageway 19 which is connected through a channel 20 to a nozzle portion described hereinafter. The annular space 14 around the projecting portion 13 also is connected through another channel 21 to the nozzle portion. These channels 20 and 21 are controlled by means of a rod-like member or cock 22 actuated by any suitable means such as an actuator 23. The rod-like member includes ports 24 and 25 formed therein which are disposed perpendicularly to the longitudinal axis of the member 22.

The injecting cylinder 10 is provided with a nozzle portion 26 including a nozzle space 27 which communicates with an injection port 28 formed in the most forward end of the injecting cylinder 10. The nozzle space 27 has at the forward portion thereof a substantially conical inner wall 29 formed adjacent to the injection port 28.

A nozzle member 30 is located within the nozzle space 27 which has a substantially cylindrical body 31 and a substantially conical head 32. The cylindrical body 31 has a passage 33 communicating with the channel 21 of the cylinder 10. The passage 33 also is connected to the forward portion of the nozzle space 27 through an orifice 34 formed in the conical head 32 of the nozzle member 30. The conical head 32 is spaced away from the conical wall 29 of the nozzle space 27 to form a flow-passage 35 communicating with the forward portion of the nozzle space 27 and thus the injection port 28 of the nozzle portion 26.

A rectifying ring member 36 is located spaced away from and around the outer periphery of the cylindrical body 31. The rectifying ring member 36 has a plurality of openings through which the flow-passage 35 is connected to the channel 20 of the cylinder 10.

A nozzle ring 40 is located adjacent to the conical head 32 of the nozzle member 30 around the flow-passage 35. The nozzle ring 40 is radially moved by adjusting screws 41 to bring it into extension of retraction from the conical wall 29 of the nozzle space 27. Consequently, the flow-passage 35 can be controlled by the nozzle ring 40 to change the flow balance of the first resin which has flowed from the accumulating bore 11 through the passageway 19, the channel 20 and the rectifying ring member 36 to the flow-passage 35.

Supposing that the first and second resins are accumulated within the accumulating bore 11 and annular space 14 by means of the plastifying screw and cylinder 12, 18, respectively, the cock 22 is positioned in such a position that the port 24 is opened and the port 25 is closed as shown in FIG. 12 prior to the injection operation. When the injecting screw 12 is moved forward, only the first resin is injected into a mold cavity (not shown) through the central passage 17 of the mandrel 16, the passageway 19 of the projecting portion 13, the channel 20, the port 24 of the cock 22, the flow-passage 35 and the injection port 28.

When a predetermined amount of the first resin has been injected into the mold cavity, the cock 22 is rotated by means of the actuator 23 to position the ports 24 and 25 thereof in such a position that a predetermined ratio of flow rate in the first and second resins is attained. Thereafter, a second shot is effected by the injecting screw 12 through the mandred 17. In this time, the second resin is injected from the annular space 14 through the channel 21, the port 25, the passage 33, the orifice 34 and the injection port 28 to the mold cavity by the forward movement of the mandrel 16.

The ratio of flow rate may be determined optionally by suitably selecting the diameter and angular relationship between the ports 24 and 25 of the cock or rod-like member 22.

Figure 13:
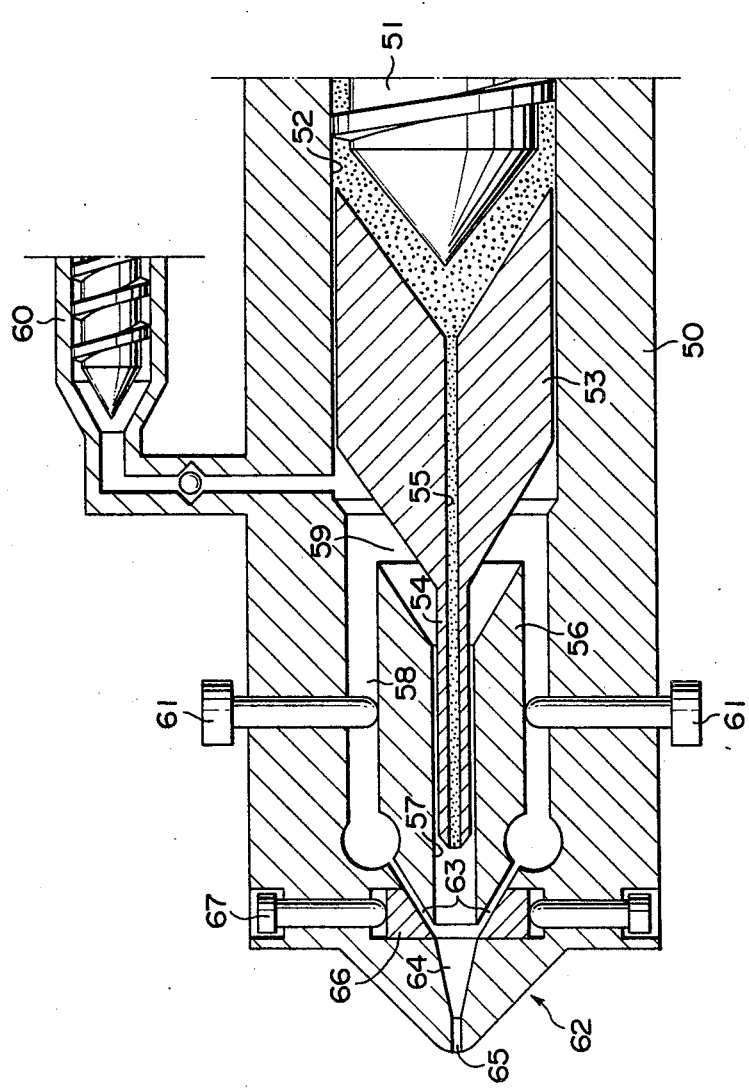
FIG. 13 is a view similar to FIG. 12 showing another injection molding machine which is a second embodiment of the present invention.

Referring to FIG. 13, the machine comprises an injecting cylinder 50 having a injecting screw 51 which is received slidably within the accumulating bore 52 of the cylinder 50. This injecting screw 51 is similar to the screw 12 in FIG. 12.

Similarly, a movable mandrel 53 is slidably mounted within the bore 52 which has at its forward end an extension 54. The mandrel 53 is provided with a central passage 55 passed longitudinally throughout the body and extension 54 thereof.

The injecting cylinder 50 has at its forward portion a projecting portion 56 extending rearward within the accumulating bore 52 thereof. The projecting portion 56 has a passageway 57 formed therein along the central longitudinal axis of the portion 56. This passageway 57 is adapted to receive the extension 54 of the mandrel 50 retaining a space interval between the outer periphery of the extension 54 and the inner periphery of the passageway 57.

The inner wall of the bore 52, the forward end of the movable mandrel 53 and the extension 54 thereof define a substantially annular space 59 which is connected to a plastifying cylinder 60 for supplying the first resin to be formed into surface layers. This cylinder 60 is similar to the plastifying cylinder in FIG. 12. The second resin for forming a core layer is similarly supplied to the bore 52 behind the mandrel 53 by means of the injecting screw 51.

Tubular passages 58 are formed around the projecting portion 56. The tubular passages 58 are controlled by adjusting means 61 to change the flow rate of the first resin flowing therethrough. The projecting portion is included in a nozzle portion 62 which is located at the forward portion of the injecting cylinder 50. The annular space 59 is connected through the tubular passages 58 and annular orifice 63 to the substantially conical nozzle space 64 of said nozzle portion 62. The nozzle space 64 is connected coaxially to an injection port 65 formed in the most forward end of the injecting cylinder 50. The passageway 57 of the projecting portion 56 is disposed coaxially with the injection port 65.

The annular orifice 63 can be controlled by means of a nozzle ring 66 and adjusting screws 67 similar to the nozzle ring and screws in FIG. 12.

Upon accumulating the first and second resins within the respective space 59 and bore 52, an initial injecting operation is attained by the forward movement of the injecting cylinder screw 51. The first resin to be firstly injected is determined by the distance between the forward end of the extension 54 and the corresponding rearward end of the projecting portion 56. Namely, when the extension 54 is spaced away from the rearward end of the projecting portion 56, the first resin only is injected through the passageway 57 of the projecting portion 56, the nozzle space 64 and the injection port 65 to a mold cavity (not shown) since the flow resistance in the passageway 57 is less than that in the central passage 55 of the mandrel 53. However, the first resin will be injected through the passageway 57, the nozzle space 64 and the injection port 65 immediately before or when the extension 54 of the mandrel 53 is received in the passageway 57 of the projecting portion 56. In this time, if the tubular passages 58 is decreased in cross-section by the adjusting means 61 to equalize the flow resistance in the tubular passages 58 to that in the central passage 55 of the mandrel 53, the second resin will be simultaneously injected through the central passage 55 from that portion of the bore 52 behind the mandrel 53.

FIG. 14 shows an injection molding machine which is still another embodiment of the present invention. The machine comprises a first injecting cylinder 70 having a first accumulating chamber 71 within which a first injecting ram or screw 72 for plastifying and injecting the resin material is housed.

A nozzle portion 73 is formed integrally in the forward end of the first injecting cylinder 70. The nozzle portion 73 defines substantially cylindrical space 74 which communicates with the first accumulating chamber 71 through a reduced bore 75 therebetween. The forward end of the nozzle portion 73 is provided with a injection port 76 which is adapted to connect with a mold cavity (not shown).

Within the cylindrical space 74 of the nozzle portion 73 there is located a second injecting cylinder 77 the forward end of which is spaced away from the inner wall of the nozzle portion except its base 78 to form a substantially annular passage 79 for the resin material flowing from the first accumulating chamber 71 of the injecting cylinder 70. The second injecting cylinder 77 has at its forward and rearward ends outer substantially conical wall portions which define substantially conical channels 80 and 81 together with the inner conical walls of the nozzle portion 73. The channels 80 and 81 communicate with the injection port 76 and reduced bore 75, respectively.

A nozzle ring 82 is located adjacent to the injection port 76 around the forward conical channel 80 for controlling this channel by actuating screw means 83 in a manner similar to that in FIG. 12.

The second injecting cylinder 77 has a second accumulating chamber 84 formed therein coaxially to the first accumulating chamber 71 of the first cylinder 70. The second accumulating chamber 84 is connected to the injection port 76 through an orifice 86 formed in the forward end of the second cylinder 77 coaxially to the injection port 76. The second accumulating chamber 84 also is connected through a duct 88 to an extruder 89 which supplies the resin material to the chamber 84 through a check valve 90.

The second accumulating chamber 84 has at its rearward end an opening within which a second injecting ram 91 is slidably received. The second ram 91 has at its rearward end a recess 92 for engaging the forward end of the first injecting ram 72.

In such an arrangement, the first resin for the surface layers is plastified and accumulated in the first chamber 71 by means of the first screw 72 while the second resin for the core layer is plastified and accumulated in the second chamber 84 by means of the extruder 89. When a predetermined amount of the resin material is charged into the respective chambers, the first screw 72 is moved forward to inject first of all the first resin in the first chamber 71 through the channels 81, 79 and 80 and the injection port 76 into the mold cavity. Further forward movement of the first ram 72 causes it to engage the second ram 91 so that it moves forward in the second chamber 84 to inject the second resin out of the second chamber 84 through the orifice 86. Thus, the second injected resin is injected through the injection port 76 together with the first resin from the channel 80 in the form of concentric circles.

The dimensions of the orifice and port 86, 76 should be appropriately determined such that the second resin is not simultaneously injected as the first resin is firstly injected. Any suitable valve means as shown in FIG. 15 may be located in the orifice 86 of the second cylinder 77 if desired. In FIG. 15, 101 is a needle valve and 102 is a backup spring.

Once the second ram 91 has been engaged by the first ram 72, the ratio of shot volume in the first resin to the second resin depends on the difference between the inner diameters of the cylinders 70 and 73. If the inner diameter of the second cylinder 77 is suitably selected, therefore, the desired ratio of shot volume can be obtained. Any suitable means for changing the inner diameter of the second cylinder 77 may be provided.

Examples of the process according to the present invention will now be described. Conditions of molding in these examples are indicated by Table 1 in which the examples indicated by Nos. 1 to 8 were attained by using the injection molding machine shown in FIG. 12 to form cylindrical closed-end parisons, each having an outer diameter of 4 cm, length of 20 cm and thickness of 4 mm.

Figure 16:
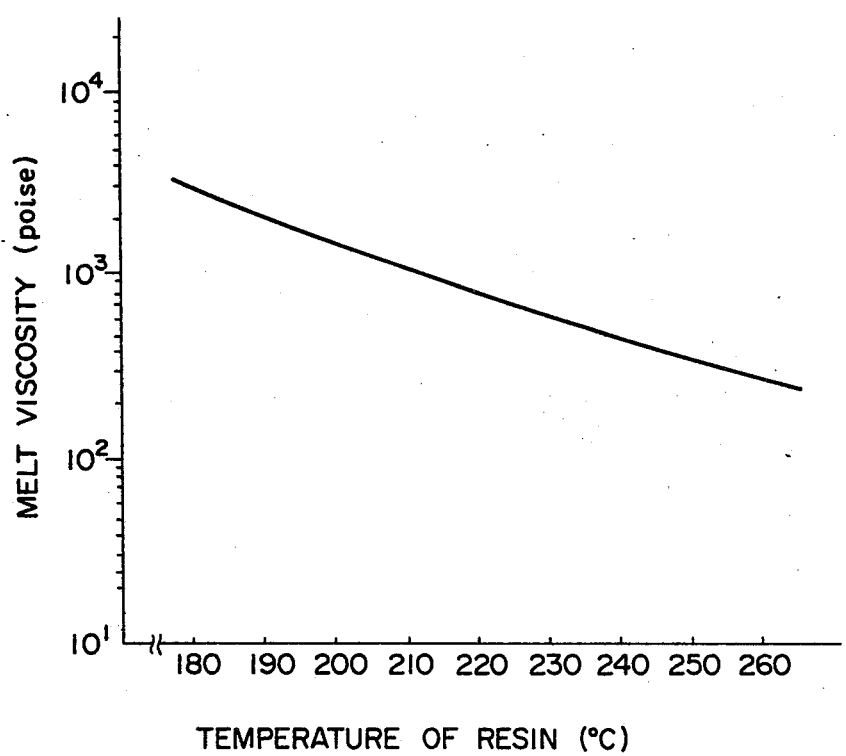
FIG. 16 is a graph showing the relationship between the melt viscosity and temperature of SAN resin.

The values M in Table 1 were obtained by the graph shown in FIG. 16. The SAN of barrier and good flow properties had melt viscosities of about $3 \times 10^2$ poise and about 60 poise at the resin temperature of 260° C., respectively. The GPPS had a melt viscosity of about $3 \times 10^3$ poise at 180° C. and the HIPS had a melt viscosity of about $2 \times 10^3$ poise at 190° C. These values of poise were all measured at a shear rate of about $10^4$ sec$^{-1}$.

In Table 1 as well as Table 2, "SAN" was a copolymer resin consisting of 30% by weight acrylonitrile and 70% by weight of styrene, "barrier SAN" was a copolymer resin consisting of 75% by weight acrylonitrile and 25% by weight styrene, "GPPS" was a polystyrene resin and "HIPS" was a high-impact polystyrene resin.

The examples indicated by Nos. 9 and 10 were attained by using the injection molding machine shown in FIG. 14 to form cylindrical closed-end parisons each having an outer diameter of 4 cm, length of 20 cm and thickness of 4 mm.

In examples of Nos. 9 and 10, "PE" was a low density polyethylene of melt index 7 g/10 min. "Blend A" consisted of 50% by weight saponified ethylene-vinyl acetate copolymer containing 25 mol % ethylene and 50% by weight low density polyethylene. "Blend B" consisted of 50% by weight saponified ethylene-vinyl acetate copolymer containing 25 mol % ethylene and 50% by weight low density polyethylene and further containing ethylene-vinyl acetate in an amount of 10 parts by weight per 100 parts by weight of the blend in which carbonyl group were present at a concentration of 450 meq/100 g. At the respective temperatures shown in Table 1, the melt viscosity of PE was about $3 \times 10^3$ poise, Blend A was about $2 \times 10^3$ poise and Blend B was about $2 \times 10^3$ poise.

Molded articles obtained in the examples of Table 1 are indicated at the numbers of Table 3 corresponding to the numbers of Table 1.

No. 8 article in Table 3 was injection molded to have the core layer of HIPS formed adjacent to the outer surface thereof. Upon applying impact, this article was cracked but not broken. No. 11 article in Table 3 was injection molded of the first transparent resin and the second colored resin under the same conditions as in No. 3 of Table 1. The resultant article was of superior appearance with the colored core layer covered by the thick transparent surface layers. Nos. 1 to 7 articles had uniform core layers extending over the length thereof adjacent to the inner surfaces of the articles except that the core layer of No. 7 article was not uniform only at the extremity thereof.

Nos. 9 and 10 articles had the core layers extending over the length thereof and could not be separated at the connection between the first and second resin layers even by applying strong impact. The gas-barrier properties thereof also were superior.

Comparison examples were attained under conditions shown in Table 2 in which the resultant articles are indicated in Table 4 by the corresponding numbers thereof. The articles of Nos. 1 and 2 all had the core layers not extending over the length thereof while the articles of Nos. 3 and 4 had the core layers exposed at the surfaces thereof.

Table 1

| No. | | Kind of resin | (Examples) Temperature of resin (°C.) | Volume of resin (cc) | First resin firstly injected (cc) | L | Q | M |
|---|---|---|---|---|---|---|---|---|
| 1 | First resin | SAN | 185 | 102 | 48 | 3 | 3 | 9 |
|   | Second resin | Barrier SAN | 260 | 18 | — | | | |
| 2 | First resin | SAN | 195 | 102 | 30 | 3 | 4 | 6 |
|   | Second resin | Barrier SAN | 260 | 18 | — | | | |
| 3 | First resin | SAN | 180 | 78 | 24 | 1.3 | 1.3 | 1.7 |
|   | Second resin | SAN | 195 | 42 | — | | | |
| 4 | First resin | SAN | 180 | 75 | 5 | 1.1 | 1.6 | 1.1 |

Table 1-continued (Examples)

| No. | | Kind of resin | Temperature of resin (°C.) | Volume of resin (cc) | First resin firstly injected (cc) | L | Q | M |
|---|---|---|---|---|---|---|---|---|
| | Second resin | SAN | 185 | 45 | — | | | |
| 5 | First resin | SAN | 180 | 90 | 30 | 2 | 2 | 4 |
| | Second resin | SAN | 225 | 30 | — | | | |
| 6 | First resin | SAN | 180 | 96 | 15 | 2.3 | 3.4 | 1.5 |
| | Second resin | SAN | 190 | 24 | — | | | |
| 7 | First resin | SAN | 180 | 117 | 3 | 31 | 38 | 50 |
| | Second resin | Good flow properties SAN | 260 | 3 | — | | | |
| 8 | First resin | GPPS | 180 | 96 | 15 | 2.3 | 3.4 | 1.5 |
| | Second resin | HIPS | 190 | 24 | — | | | |
| 9 | First resin | PE | 180 | 96 | 15 | 2.3 | 3.4 | 1.5 |
| | Second resin | Blend A | 190 | 24 | — | | | |
| 10 | First resin | PE | 180 | 96 | 15 | 2.3 | 3.4 | 1.5 |
| | Second resin | Blend B | 180 | 24 | — | | | |

Table 2

(Comparison Examples)

| No. | | Kind of resin | Temperature of resin (°C.) | Volume of resin (cc) | First resin firstly injected (cc) | Q | M |
|---|---|---|---|---|---|---|---|
| 1 | First resin | SAN | 260 | 102 | 48 | 3 | 0.1 |
| | Second resin | SAN | 180 | 18 | — | | |
| 2 | First resin | SAN | 260 | 102 | 30 | 4 | 0.2 |
| | Second resin | SAN | 180 | 18 | — | | |
| 3 | First resin | SAN | 180 | 70 | 7 | 1.3 | 1.5 |
| | Second resin | SAN | 190 | 50 | — | | |
| 4 | First resin | SAN | 180 | 55 | 7 | 0.7 | 10 |
| | Second resin | SAN | 260 | 65 | — | | |

Table 3

(Examples)

| No. | Thickness of core layer (mm) | Thickness of hardening layer (mm) | State of core layer |
|---|---|---|---|
| 1 | 0.6 | 0.8 | Uniform core layer extending over the length of the article adjacent to the inner face thereof |
| 2 | 0.6 | 0.8 | " |
| 3 | 1.4 | 0.4 | " |
| 4 | 1.5 | 0.4 | " |
| 5 | 1.0 | 0.5 | " |
| 6 | 0.8 | 0.7 | " |
| 7 | 0.1 | 0.8 | " |
| 8 | 0.8 | 0.7 | Uniform core layer extending over the length of the article adjacent to the outer face thereof |
| 9 | 0.8 | 0.7 | Uniform core layer extending over the length of the article adjacent to the inner face thereof |
| 10 | 0.8 | 0.7 | " |
| 11 | 1.4 | 0.4 | " |

Table 4

(Comparison Examples)

| No. | Thickness of core layer (mm) | Thickness of hardening layer (mm) | State of core layer |
|---|---|---|---|
| 1 | 1.2 | 0.8 | Core layer extending over 50% of the length of the article |
| 2 | 1.2 | 0.6 | " |
| 3 | — | — | Core layer exposed at the mid portion of the article |
| 4 | — | — | " |

We claim:

1. A multi-layered molded article having the shape of a vessel, closed-end parison, disk or the like, said article comprising in its cross-section a triple-layered structure consisting of two surface layers of different thicknesses and a core layer interposed between said surface layers, said triple-layered structure having been injection molded in a mold cavity in a single shot from two different kinds of thermoplastic synthetic resin to form said surface and core layers, respectively, said core layer having a thickness less than one half of the entire thickness of said article, said triple-layered structure having its crosssection represented by $$a+b < \tfrac{1}{2}(a+b+c)$$

where a is the thickness of the core layer, b is the thickness of the thinner surface layer and c is the thickness of the thicker surface layer.

2. The multi-layered molded article as set forth in claim 1, wherein the value of (a+b+c) is less than or equal to 4 mm.

3. The multi-layered molded article as set forth in claim 1, wherein the value of a is less than 1 mm but greater than or equal to 0.05 mm.

4. The multi-layered molded article as set forth in claim 1, said article having been produced by first injection molding said synthetic resins into a cylindrical preform and subsequently blow molding said preform.

5. The mult-layered molded article as set forth in claim 1, said article having been produced by first of all injection molding said synthetic resins into a disk-like or sheet-shaped preform and subsequently forming said preform under vacuum or under vacuum and pressurized air.

6. The multi-layered molded article as set forth in claim 1, wherein the thermoplastic synthetic resin forming said core layer is a gas barrier resin.

7. The multi-layered molded article as set forth in claim 6, wherein said gas barrier resin is at least one member selected from the group consisting of a vinyl chloride-vinylidene chloride copolymer, saponified ethylene-vinyl acetate copolymer, nylon, and a acrylonitrile-styrene copolymer containing a major amount of acrylontrile.

8. The multi-layered molded article as set forth in claim 6, wherein said synthetic resin used to form said surface layers is a polyolefin, and said barrier resin is a blend containing a polyolefin as well as at least a saponified ethylene-vinyl acetate copolymer, the weight ratio of said polyolefin and saponified ethylene-vinyl acetate copolymer in said blend being 10–90:90–10.

9. The multi-layered molded article as set forth in claim 8, wherein said blend consists of a saponified ethylene-vinyl acetate copolymer, polyolefin and thermoplastic polymer in which carbonyl groups are present at a concentration of 120–1400 meq per 100 g of said polymer at its backbone chain or side chain, said polymer being present in the range of 0.5 to 15 parts by weight per 100 parts by weight of the total amount of said polyolefin and saponified ethylene-vinyl acetate copolymer.

10. The multi-layered molded article as set forth in claim 1, wherein the thermoplastic synthetic resin used to form said core layer has high-impact properties.

11. The multi-layered molded article as set forth in claim 10, wherein said high-impact synthetic resin is selected from the group consisting of a acrylonitrile-butadiene-styrene copolymer, acrylonitrile-styrene copolymer, high-impact polystyrene, polyethylene terephthalate, nylon, polyacetal and polycarbonate.

12. The multi-layered molded article as set forth in claim 1 wherein the value of (a+b+c) is less than or equal to 4 mm, the value of a is less than 1 mm but greater than or equal to 0.05 mm, the thermoplastic synthetic resin forming said core layer is a gas barrier resin including at least one member selected from the group consisting of a vinyl chloride-vinylidene chloride copolymer, saponified ethylene-vinyl acetate copolymer, nylon and an acrylonitrile-styrene copolymer containing a major amount of acrylonitrile, and the synthetic resin used to form the surface layers is a polyolefin.

13. The multi-layered molded article as set forth in claim 12 wherein said gas barrier resin is a blend containing a polyolefin as well as at least a saponified ethylene-vinyl acetate copolymer, the weight ratio of said polyolefin and saponified ethylene-vinyl acetate copolymer in said blend being 10–90:90–10.

* * * * *